United States Patent [19]

Wada et al.

[11] Patent Number: 4,984,812
[45] Date of Patent: Jan. 15, 1991

[54] OIL SEAL ASSEMBLY

[75] Inventors: Yoshiaki Wada, Niigata; Tunesaku Itaba; Koichiro Kasahara, both of Kashiwazaki; Tomokimi Mizuno, Chiryu; Yutaka Momose, Anjyo, all of Japan

[73] Assignees: Kabushiki Kaisha Riken, Tokyo; Aisin Seiki Kabushiki Kaisha, Kariya, both of Japan

[21] Appl. No.: 428,435

[22] Filed: Oct. 30, 1989

Related U.S. Application Data

[63] Continuation of Ser. No. 167,099, Mar. 11, 1980, abandoned.

[30] Foreign Application Priority Data

Mar. 31, 1987 [JP] Japan .................................. 62-76334

[51] Int. Cl.$^5$ .................................................. F16J 15/00
[52] U.S. Cl. ........................................ 277/153; 277/182
[58] Field of Search ........................... 277/3, 47, 144

[56] References Cited

U.S. PATENT DOCUMENTS

| | | | |
|---|---|---|---|
| 2,672,359 | 3/1954 | Fisher, Jr. et al. | 277/153 |
| 2,930,643 | 3/1960 | Mastrobattista et al. | 277/212 |
| 2,998,987 | 9/1961 | Taschenberg et al. | 277/144 |
| 3,214,179 | 10/1965 | Dega | 277/153 |
| 3,373,998 | 3/1968 | Bialkowski | 277/110 |
| 3,871,665 | 3/1975 | Burke et al. | 277/153 |
| 3,921,992 | 11/1975 | Bertin | 277/153 |
| 4,170,363 | 10/1979 | Bergman | 277/24 |
| 4,671,519 | 6/1987 | Bras et al. | 277/153 |

FOREIGN PATENT DOCUMENTS

| | | | |
|---|---|---|---|
| 3008955 | 9/1981 | Fed. Rep. of Germany | 277/153 |
| 494343 | 5/1954 | Italy | 277/47 |
| 58-207579 | 12/1983 | Japan | 277/3 |
| 433888 | 10/1967 | Switzerland | 277/47 |
| 590128 | 4/1946 | United Kingdom | 277/47 |
| 712777 | 7/1954 | United Kingdom | 277/47 |
| 875227 | 8/1961 | United Kingdom | 277/47 |
| 1457261 | 12/1976 | United Kingdom | 277/152 |

Primary Examiner—William A. Cuchlinski, Jr.
Assistant Examiner—Daniel G. DePumpo
Attorney, Agent, or Firm—Burns, Doane, Swecker & Mathis

[57] ABSTRACT

An oil seal assembly includes an oil seal having a lip contacting the outer peripheral surface of a reciprocating shaft, a holder for holding the oil seal about the shaft, and an annular spring for urging the lip against the outer peripheral surface of the shaft. The lip has a flat surface which is inclined with respect to the outer peripheral surface of the shaft. When the oil seal is mounted on the shaft, the flat surface is brought into surface contact with the outer peripheral surface of the shaft by an urging force applied by the spring.

4 Claims, 2 Drawing Sheets

OIL SEAL ASSEMBLY

This application is a continuation, of application Ser. No. 07/167,099, filed Mar. 11, 1988.

BACKGROUND OF THE INVENTION

1. Field of the Invention

This invention relates to an oil seal assembly suitable for sealing a reciprocating shaft.

2. Description of the Prior Art

As seen in compressors or Stirling engines, the hermetic seal about a rod connecting a driving source with a piston which forms a compression chamber is vital in terms of raising the compression ratio and minimizing leakage of the working gas.

The conventional oil seal assembly includes an annular oil seal the inner peripheral portion of which has a radially inwardly projecting lip of a generally triangular cross section. The lip is kept in pressured contact with a reciprocating shaft by an annular spring disposed at its back. High-pressure gas from a compression chamber is prevented from leaking by the lip and an oil confined within the oil seal. A cutting operation is used to form the lip and to provide the oil seal with a predetermined inner diameter. However, the cutting operation provides neither a stable position for the lip nor a stable inner diameter. There is also an offset between the line along which the urging force of the spring acts and the tip of the lip, thus detracting from oil sealing performance.

SUMMARY OF THE INVENTION

Accordingly, an object of the invention is to provide an oil seal assembly which solves the aforementioned problems in order to improve sealing capability.

According to the present invention, the foregoing object is attained by providing an oil seal assembly comprising an oil seal having a lip contacting an outer peripheral surface of a reciprocating shaft, a holder for holding the oil seal about the shaft, and an annular spring for urging the lip against the outer peripheral surface of the shaft, the lip having a flat surface which is inclined with respect to the outer peripheral surface of the shaft, wherein when the oil seal is mounted on the shaft, the flat surface is brought into surface contact with the outer peripheral surface of the shaft by an urging force applied by the spring.

In a preferred embodiment of the invention, a space defined on a radially outer side of the lip is filled with oil. Furthermore, one edge of the flat surface of the lip is situated on a plane in which the annular spring lies and which passes through the center of the annular spring.

Following cutting machining that forms an inclined surface indicated by an angle $\theta_1$, the lip portion is subjected to flattening machining to form the flat surface. Fabrication of the lip is thereby facilitated since it is unnecessary to perform cutting machining to produce a point of intersection for the purpose of forming the lip.

When the flat surface of a lip is made parallel to the outer peripheral surface of the shaft without being inclined, the edges of the flat surface are acted upon by the urging force of the spring. At the time of use, therefore, riding up of the lip and the width of contact between the lip and the outer peripheral surface of the shaft are reduced. However, use of the inclined flat surface as in the present invention assures a sufficient width of contact between the lip and the outer circumferential surface of the shaft, and a peak contact pressure is reliably produced in one edge of the flat surface, thereby enabling sealability to be improved.

Other features and advantages of the present invention will be apparent from the following description taken in conjunction with the accompanying drawings, in which like reference characters designate the same or similar parts throughout the figures thereof.

FURTHER DESCRIPTION OF THE PRIOR ART

Figure 1:
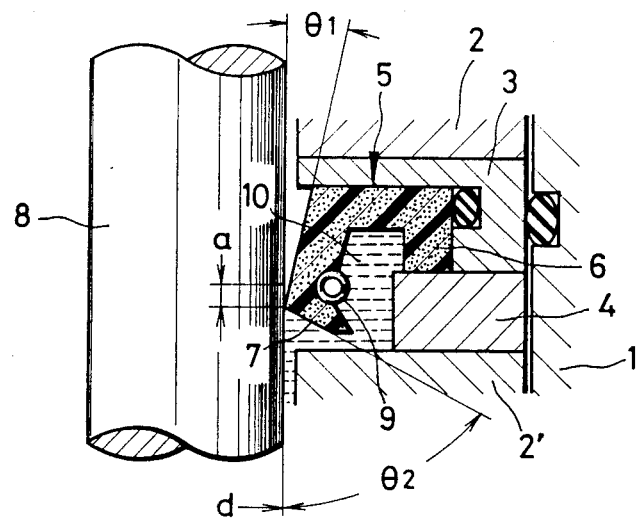
FIG. 1 is a partial sectional view of an example of the prior art.

Before describing an embodiment of the present invention in detail, let us refer to FIG. 1 for a more detailed review of the art to which the present invention appertains.

An example of a conventional reciprocating shaft seal assembly will now be described with reference to FIG. 1.

A holder 3 made of metal and a retainer 4 are arranged between intermediate members 2, 2' spaced away from the inner periphery of a casing 1, and an oil seal 5 is retained by the holder 3 and retainer 4. The oil seal 5, which is made of polytetrafluoroethylene (PTFE), has an annular main body 6 the cross section of which is of a generally inverted U-shaped configuration. The inward leg of main body 6 has a lip 7 of a generally triangular cross section projecting radially inward. The lip 7 contacts a reciprocating shaft 8 and has an annular spring 9 disposed at its back to increase the pressure at which the lip contacts the shaft. The space between the legs of the main body 5 where the spring 9 is situated is filled with oil 10.

High-pressure gas from a compression chamber is prevented from leaking toward the side of the driving source by the lip 7 and oil 10, and the scraping up of the oil 10 is prevented by the lip 7.

As will apparent from FIG. 1, the inner face of the inward leg of the main body 6 is cut to angles of $\theta_1$, $\theta_2$ with respect to the outer periphery of the shaft 8 in order to form the lip 7. This cutting machining not only forms the lip 7 but also provides the oil seal 5 with a predetermined inner diameter d. However, the cutting machining results in instability insofar as the position of the lip 7 and the inner diameter d are concerned. In addition, since there is an offset a between the line along which the urging force of spring 9 acts in the radially inward direction and the apex of the lip 77, oil sealability is highly unstable.

Thus, the conventional oil seal assembly involves problems in terms of the lip machining operation and the sealability of the oil.

DESCRIPTION OF THE PREFERRED EMBODIMENT

The present invention is directed to solving the foregoing problems and an embodiment thereof will now be described in detail with reference to FIGS. 2, 3 and 4. Portions similar to those shown in FIG. 1 are designated by like reference characters.

An oil seal assembly according to the invention includes a single oil seal 11 made of PTFE. The oil seal 11 has an annular main body 12 the cross section of which is of a generally inverted U-shaped configuration. The inner peripheral surface of the inward leg of main body 12 is cut to have an inclination, indicated by angle $\theta_1$, with respect to the peripheral surface of the shaft 8. The crest of the inclination is formed to have a flat surface 13 of dimension b serving as a lip. The main body 12 is formed to have a step 14 below the flat surface 13. The annular spring 9 is arranged on the back side of the flat surface 13 and step 14. It is arranged so that a plane in which the spring 9 lies and which passes through the center of the spring 9 (namely a plane in the direction in which the urging force of the spring acts) passes through one edge 15 of the flat surface 13. As a result, peak contact pressure is produced at the edge 15 between the reciprocating shaft 8 and the flat surface 13 contacting the shaft, thereby enhancing the sealing effect.

Figure 2:
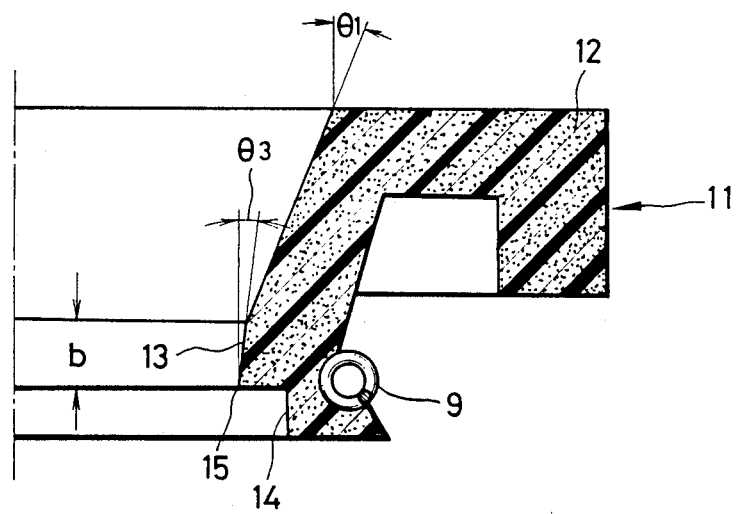
FIG. 2 is a partial sectional view illustrating an example of an oil seal used in the oil seal assembly of the present invention.

Before the oil seal 11 is mounted on the shaft, as shown in FIG. 2, the flat surface 13 has an inclination of angle $\theta_3$ with respect to the outer peripheral surface of the shaft 8. It is assumed here that the angle of inclination $\theta_3$ ranges from 1°30′ to 3° C.

Figure 3:
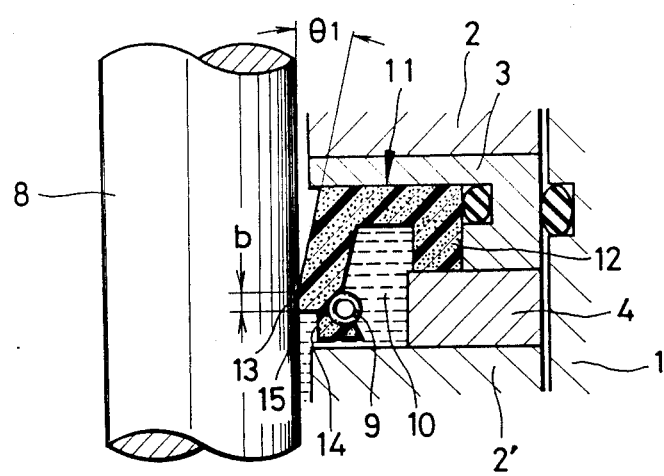
FIG. 3 is a partial sectional view illustrating the oil seal of FIG. 2 in use.

When the oil seal 11 with the lip having the flat surface 13 of inclination angle $\theta_3$ is mounted on the shaft 8, the flat surface 13 comes into surface contact with the outer peripheral surface of the shaft 8, as shown in FIG. 3, and the edges of the flat surface do not ride up the shaft. In the region where the flat surface 13 contacts the outer peripheral surface of the shaft 8, the one edge 15 of the flat surface 13 is acted upon by the urging force of the spring 9 and exhibits peak contact pressure. This serves to improve the sealing effect.

Figure 4:
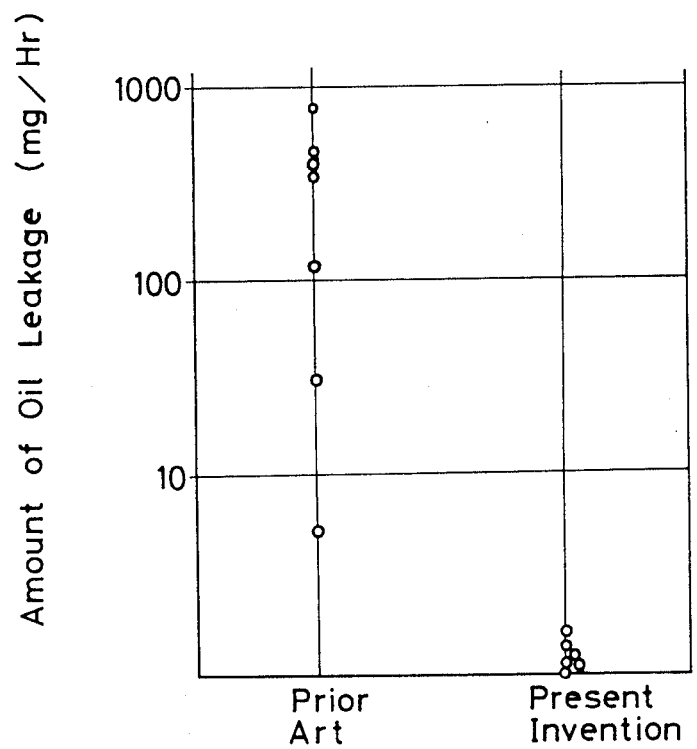
FIG. 4 is a graph illustrating the amount of oil consumed in accordance with the prior art and the present invention.

FIG. 4 illustrates the results of a comparison test, in which the amount of oil leakage was measured, under conditions where the reciprocating stroke of the shaft 8 was 5.5 mm, the number of reciprocations was 1300 times per minute and the temperature of the oil 10 was 80°±2° C. In the illustrated embodiment, use was made of an oil seal in which the angle of inclination $\theta_3$ ranged from 1°30′ to 3° C. and the width b of the flat surface 13 was 1 mm. FIG. 4 demonstrates that the amount of oil leakage in the embodiment of the present invention is much less than that in the prior art.

In the oil seal assembly of the present invention, the flat surface is brought into surface contact with the outer peripheral surface of the reciprocating shaft and peak contact pressure is exhibited at an edge portion of the flat surface. As a result, the sealing effect is improved.

Furthermore, the machining of the inclined flat surface raises dimensional precision at the time of the cutting machining operation without producing burrs.

As many apparently widely different embodiments of the present invention can be made without departing from the spirit and scope thereof, it is to be understood that the invention is not limited to the specific embodiments thereof except as defined in the appended claims.

What we claim is:

1. An oil seal assembly comprising:
   an oil seal having a lip for contacting an outer peripheral surface of a reciprocating shaft;
   a holder for holding said oil seal about the shaft; and
   an annular spring for urging the lip against said outer peripheral surface of the shaft;
   said lip including first and second flat surfaces inclined with respect to said outer peripheral surface of the shaft, said first flat surface having a first angle of inclination greater than a second angle of inclination of said second flat surface in the absence of contact between said second flat surface and said peripheral surface, said second angle of inclination having a value substantially within a range of 1°30′ to 3° C. such that when said oil seal is mounted on the shaft, said second flat surface provides a sealing surface having a substantially constant width, said second flat surface being brought into surface contact with said outer peripheral surface of the shaft by an urging force applied by said annular spring, said second flat surface being formed along an entire circumferential inner surface of said lip.

2. The oil seal assembly according to claim 1, wherein a space is defined on a radially outer side of said lip, said space being filled with oil.

3. The oil seal assembly according to claim 2, wherein one edge of said second flat surface of said lip is situated on a plane in which said annular spring lies and which passes through the center of said annular spring.

4. The oil seal assembly according to claim 1, wherein the oil seal is comprised of PTFE.

* * * * *